Nov. 8, 1966 — M. J. THOMAS — 3,283,792
PORTABLE MILL
Filed Dec. 16, 1963 — 2 Sheets-Sheet 1
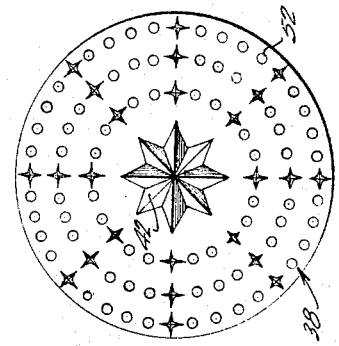
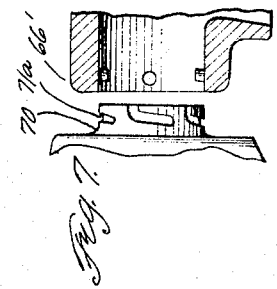
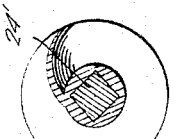
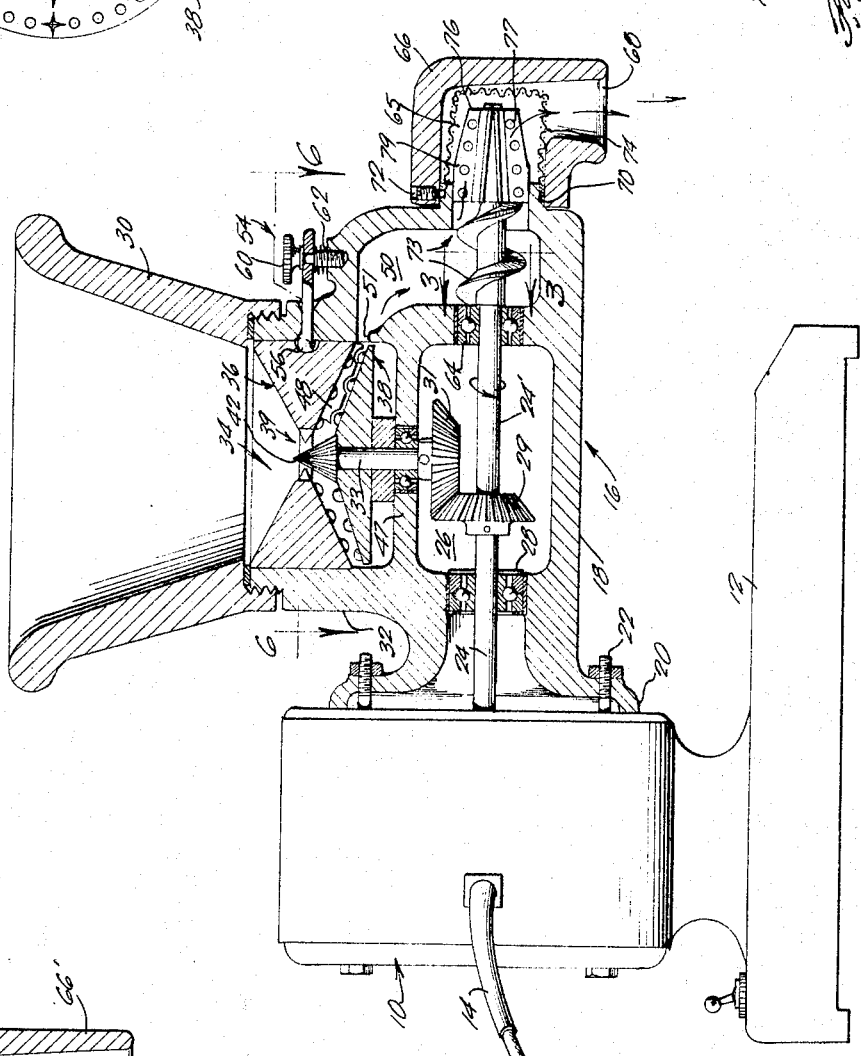
INVENTOR.
MATTHEW J. THOMAS
BY
Victor J. Evans & Co.
Attorneys Nov. 8, 1966
M. J. THOMAS
3,283,792
PORTABLE MILL
Filed Dec. 16, 1963
2 Sheets-Sheet 2
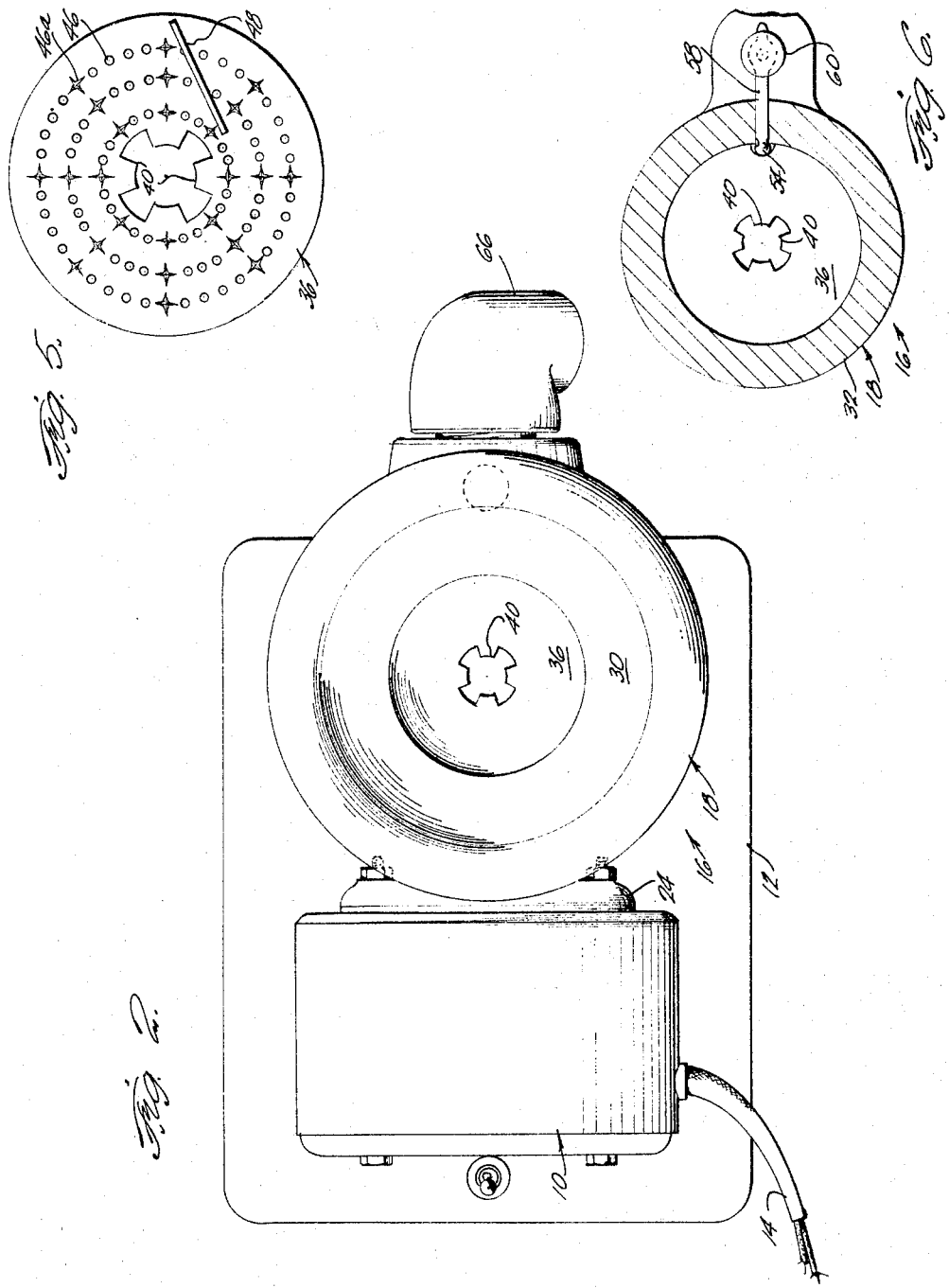
INVENTOR.
MATTHEW J. THOMAS
BY
Victor J. Evans & Co.
Attorneys 3,283,792
PORTABLE MILL
Matthew J. Thomas, P.O. Box 26121, Los Angeles, Calif.
Filed Dec. 16, 1963, Ser. No. 336,094
2 Claims. (Cl. 146—192)

This invention relates to a portable mill which is particularly useful for making nut butter from nut meats, but which may also be used for grinding other materials, such as grain.

It is an object of this invention to provide a portable mill particularly suitable for making nut butter which includes, in a single compact machine, means for grinding the nut meats and also for whipping the ground nut meats into nut butter or the like.

It is another object of the invention to provide a portable mill for making nut butter or the like having means for providing a slow grinding speed and a fast whipping speed from a single drive motor.

It is another object of the invention to provide a portable mill for nut butter or the like which can be easily mounted on the drive motor housing so as to receive the drive shaft of the motor.

It is still a further object of the invention to provide a portable mill for nut butter or the like which may be easily disassembled for cleaning.

In achievement of these objectives, there is provided in accordance with this invention a portable mill particularly suited for grinding nut meats and for whipping the ground nut meats into nut butter and also for grinding grain, which includes a housing adapted to be mounted onto the end of a motor housing so as to receive the horizontal output shaft of the motor. The output shaft of the motor drives a revolving mill disc which rotates adjacent a stationary mill disc. A conical-shaped preliminary cutter or grinder is mounted on the same shaft as the rotatable milling disc and serves to provide a preliminary cutting or grinding operation on the nut meats to reduce them to a sufficient size to fit between the stationary and rotatable milling discs, and also serves to feed the nut meats into the space between the milling discs. Means is also provided for adjusting the spacing between the rotatable and stationary milling discs and also for removing the stationary milling disc for cleaning. The ground nut meats are delivered from the milling discs to a whipper having perforated whipping blades which are driven directly from the output shaft of the motor and revolve at high speed to whip the ground nut meats or other materials into a butter-like consistency.

Further objects and advantages of the invention will become apparent from the following description taken in conjunction with the accompanying drawings in which:

FIG. 1 is a view, partially in elevation, and partially in section, of the portable mill mounted on a drive motor;

FIG. 2 is a top plan view of the mill and motor of FIG. 1;

FIG. 3 is a view in vertical section along line 3—3 of FIG. 1;

FIG. 4 is a top plan view of the rotatable milling disc;

FIG. 5 is a bottom plan view of the stationary milling disc;

FIG. 6 is a view in horizontal section along line 6—6 of FIG. 1;

FIG. 7 is a fragmentary view in side elevation showing a modified type of quick detachable end piece; and FIG. 8 is a view in section of the whipping chamber and outlet end piece having a screw-threaded attachment to the main housing.

Referring now to the drawings, and more particularly to FIG. 1, there is shown an electric motor generally indicated at 10, which may be one-half horsepower, 110–220 volts, for example, and which is mounted on a horizontal base 12. The input power to the motor is provided through input cable 14. The portable nut butter mill of the invention is generally indicated at 16 and includes a housing 18 having a mounting flange 20 secured by suitable fastening means 22 to the end wall of motor housing 10. To facilitate assembly of the mill 16, the housing 18 is made in two longitudinal sections which are suitably bolted together along a horizontal joint line, not shown in the drawings. The output shaft 24 of the motor projects into the gear case 26 in the lower portion of housing 18 of the portable mill. Shaft 24 is supported for rotation by a ball bearing 28 suitably positioned within housing 18. Shaft 24 has a bevel gear 29 attached thereto for rotation in a vertical plane. Gear 29 mates with and drives a second bevel gear 31 mounted on the lower end of vertical shaft 33 which drives the preliminary grinder and feeder 42 and also drives the rotatable milling disc 38, as will be described in more detail hereinafter. The horizontally rotatable bevel gear 31 is so proportioned relative to bevel gear 29 as to cause vertical shaft 33 to rotate at a speed which is substantially lower than that of the output shaft 24 of the motor.

Gear case 26 does not require any oil therein since the gears are made of suitable materials or combinations of materials which do not require lubrication, such as fiber and brass.

A feed mouth 30 is detachably connected by a screw thread connection at the lower end thereof to the upper end of the generally cylindrical vertical wall 32 which bounds the milling chamber generally indicated at 34. Milling chamber 34 has positioned therein a stationary but removable upper milling disc generally indicated at 36 and a lower rotatable milling disc generally indicated at 38 mounted on and rotatable with vertical shaft 33. The upper surface of stationary milling disc 36 is of generally conical shape and terminates at the lower portion thereon in an opening 39 through which the nut meats pass on their way to the milling operation. A plurality of circumferentially-spaced crushing shoulders 40 are carried by milling disc 36 and project horizontally radially inwardly into the opening 39 where they cooperate with the conical-shaped preliminary grinding and feeding member 42 on the upper end of shaft 33 to perform a preliminary crushing and grinding operation on the nut meats before they pass into the milling space between the stationary and revolving milling discs.

The underneath surface of the stationary milling disc 36 which faces the upper surface of the rotating milling disc 38 is provided with a plurality of concentric rings of crushing or grinding pins 46. Most of the pins 46 are round in horizontal cross section, but a predetermined number of pins, such as every fourth pin in a given concentric ring, for example, may be of cross-shape in horizontal cross section, as indicated at 46a. Some of the pins may also be of triangular shape in horizontal cross section.

A resiliently or spring-mounted scraping blade 48 extends radially across the under surface of the stationary milling disc 36 and is provided with recesses to permit passage therethrough of grinding or crushing pins 52 carried by the upper surface of the rotatable milling disc 38, as will be described. The scraping blade 48 is positioned adjacent the passage 51 through which the crushed nut meats are delivered to the combined chute and feed chamber generally indicated at 50, which leads to the whipping chamber 65. Scraping blade 48 serves to clean the grinding pins 52 on the upper surface of the rotatable milling disc now to be described and to cause the material scraped from the grinding pins 52 to pass into the combined chute and chamber 50.

The upper surface of the lower and rotatable milling disc 38 is provided with a plurality of concentric rings of crushing pins 52 which are adapted to cooperate with the plurality of concentric grinding or crushing pins 46 on the under surface of the stationary milling disc, to thereby perform the grinding operation. Pins 52 may be similar in types cross section to the pins of upper grinding disc 36 previously described. The concentric rings of pins 46 and 52 on the respective milling discs are so spaced with relation to each other as to permit the rows of pins on one milling disc to pass between the rows of pins on the other milling disc as the lower milling disc revolves.

The surface 47 beneath the lower end of rotatable disc 38 constitutes an apron which receives any material which may drop beneath the lower disc 38. Apron 47 communicates with and opens into the combined chute and feed chamber 50 whereby any materials which drop into apron 47 are delivered into combined chute and chamber 50.

Means is provided for adjusting the spacing between the facing surfaces of the stationary and rotatable milling discs, as will now be described, to therefore adjust the fineness or coarseness of the grinding operation.

The stationary milling disc 36 is provided at one portion of its peripheral side wall surface with a socket-like recess 54 which receives the end of a short lever 58 which passes through the adjacent side wall of the housing 18 with sufficient clearance being provided to permit a predetermined amount of pivotal movement of lever 58 about a fulcrum provided by the bearing surface in the passage through the housing which receives the lever. An adjusting thumbscrew 60 passes through an aperture in the outer end of lever 58, the lower end of the adjusting screw being received in a threaded passage in the wall of housing 18. A spring 62 is positioned concentrically about the shank of thumb screw 60 beneath the surface of lever 58 and biases the lever into an upward position against a shoulder on the upper portion of the thumbscrew. To adjust the spacing between the facing surfaces of the discs 36 and 38, and hence the fineness or coarseness of the grind provided by the grinding discs, thumbscrew 60 may be adjusted to thereby raise or lower the end of the lever which is received in the recess 54 of stationary milling disc 36. This raises or lowers disc 36 to permit adjusting the spacing between the facing surfaces of the two discs 36 and and 38 and also permits raising the stationary disc 36 sufficiently to permit grasping of the upper end of the stationary disc to allow removal thereof for cleaning.

An extension 24' of motor drive shaft 24 projects beyond bevel gear 29 and is supported by a ball bearing assembly 64. The shaft extension 24' projects into the lower portion of the combined chute and feed chamber 50 and thence into the whipping chamber 65. Chute and feed chamber 50 communicates at its upper end with the milling space between discs 36 and 38 by outlet passage 51 through which the ground material passes into the combined chute and chamber 50. The whipping chamber 65 is defined in part by the end of housing 18 and in part by the removable end piece 66. The piece 66 has an outlet opening 68 therein through which the whipped nut meats or the like may be discharged into a suitable receptacle. The end piece 66 may be secured in position on the shoulder 70 at the end of housing 18 by means of a set screw 72, as shown in FIG. 1, or may be screw-threadedly engaged with the end shoulder of the housing 18 as indicated in the modified form of FIG. 8.

The portion of the shaft extension 24' lying in the combined chute and feed chamber 50 has a worm feed member 73 mounted thereon. A rotatable whipper 76 having a plurality of circumferentially spaced radially-extending wings 77 which beat and agitate the ground nut meats or the like is integral with the worm feed member 73 and projects into the whipping chamber. Each of the wings or blades 77 is provided with a plurality of perforations 79 which are important in the whipping action which converts the ground nut meats to nut butter, since solid blades are not satisfactory for this purpose.

The whipper 76 and worm feed member 73 may be formed on a common core which is in screw-threaded engagement with the threaded end of shaft extension 24', in a manner similar to that shown in my prior United States Patent 2,558,799, which issued on July 3, 1951.

There is shown in FIG. 7 a modified type of end piece 66' having a quick detachable connection with the shoulder 70' on the housing 18. For this purpose, shoulder 70' is provided with a plurality of slots 71a which extend inwardly from the outer peripheral edge of the shoulder, and the end piece 66' is provided with a corresponding number of pins 71b, with each pin 71b engaging one of the slots 71a. To engage the end piece 66' with shoulder 70', each pin 71b is engaged with its corresponding slot at the outer peripheral edge of the shoulder, and the end piece is then given a quarter turn in a counterclockwise direction to engage each pin 71b with the inner end of its respective slot, thereby locking the end piece 66' on the shoulder 70'. To disengage the end piece from the shoulder, the end piece is given a quarter turn in a clockwise direction, causing each pin to move out of its corresponding slot, and thereby disengaging the end piece from the shoulder.

In certain types of juicing or liquifying operations for which the apparatus may be used, it may be desirable to use a screen 74, as seen in FIGS. 1 and 8, although a screen is not used when making nut butter as previously described. Screen 74 may have a mesh of a suitable size and is positioned within whipping chamber in enclosing but spaced relation to whipper 76, the axially inner end of the screen being supported by shoulder 70 of casing 18. The liquids or juices pass outwardly through the screen and through the outlet 68 into a suitable receptacle positioned beneath outlet 68.

When liquifying or juicing materials of a pulpy nature, such as oranges or the like, I prefer to substitute for the end piece 66 and screen 74 shown in FIG. 1, a member similar to the extractor housing 42 shown in FIG. 4 of my United States Patent 2,588,799, having a screen therein such as the screen 46 described in that patent, and having an outlet 48 for receiving the pulp and an outlet 43 through which the juice may pass to a receptacle. The extractor housing could be attached to the end wall of the portable mill 16, or to the shoulder 70, either in the manner taught in Patent 2,558,799, or in any of the various ways described in this specification for attaching the end piece 66 or the various modifications thereof.

In using the portable mill of the invention, the nut meats or other materials which are to be crushed and whipped, such as cocoanut, carrots, raisins, grain, etc., are poured into the open feed mouth 30, and then pass down through the opening 39 at the lower portion of stationary grinding disc 36, where the conical grinding and feeding member 42 performs a preliminary cutting and grinding operation upon the materials, in cooperation with the crushing shoulders 40 which are carried by the upper grinding disc 36 in the region of opening 39. The spacing between the milling discs 36 and 38, and hence the fineness of grind, may be adjusted by adjusting the thumbscrew 60 to raise or lower the lever 58 which engages recess 54 in the side wall of the upper disc 36. The materials to be ground, having been reduced in size by the preliminary grinding member 42, then pass into the space between the upper and lower grinding discs 36 and 38 are subjected to the grinding operation provided by the plurality of intermeshing rings of crushing and grinding pins 46 and 52 on the facing surfaces of the upper and lower milling discs.

The ground nut meats or the like pass from between the grinding discs 36 and 38 to the combined chute and feed chamber 50 where they are fed by the worm feed member 73 into the whipping chamber 65 where they are whipped by whipper 76, and then are delivered by means of outlet 68 to a suitable receptacle for receiving the whipped nut butter or other whipped material.

The portable mill hereinbefore described may be easily disassembled for cleaning by unscrewing the feed mouth 30 from its screw-threaded connection to the upper end of the milling chamber. The stationary milling disc 36 may then be removed for cleaning and the rotatable milling disc 38 and preliminary grinder 42 are then also accessible for cleaning. The end piece 66 may be easily removed by lossening the set screw 72 of FIG. 1, or by unscrewing the end piece 66' in the embodiment of FIG. 8 from its screw-threaded engagement with shoulder 70'. This then gives access to the integral worm feed member 73 and whipper 76 which may be unscrewed from the end of shaft extension 24' for cleaning.

It can be seen from the foregoing that there is provided in accordance with this invention a portable mill which is particularly suitable for making nut butter or the like, but which may also be used for grinding and whipping other materials, such as cocoanut, raisins, or mixtures of various nuts, fruits, or the like. The portable mill may also be used for grinding grains. The portable mill provides both a slow speed grinding operation and a high speed whipping operation from the same drive motor.

While there has been shown and described a particular embodiment of the invention, it will be obvious to those skilled in the art that various changes and modifications may be made therein without departing from the invention and, therefore, it is aimed to cover all such changes and modifications as fall within the true spirit and scope of the invention.

What I claim as my invention is:

1. A mill for nut meats and the like comprising a housing, a milling chamber within said housing, a stationary milling disc and a rotatable milling disc positioned within said milling chamber in facing relation to each other to define a milling space therebetween, said stationary disc having an opening therein through which the material to be ground may be fed into the milling space between said discs, a feeding and preliminary grinding means mounted for rotation in said opening of said stationary disc, said feeding and preliminary grinding means being mounted on a common shaft with said rotatable milling disc, means for rotating said common shaft, a whipping chamber, a rotatable whipping member disposed in said whipping chamber, means for delivering ground material from said milling space to said whipping chamber, means for rotating said whipping member, and means for discharging material from said whipping chamber, each of said milling discs including a plurality of concentric rings of grinding pins which are so positioned on the respective discs as to be in intermeshed relation to the rings of the other disc, and means for adjusting the spacing between the facing surfaces of the two milling discs, said whipper member including a plurality of circumferentially spaced radially extending blades having perforations therein.

2. A mill as defined in claim 1 in which said stationary grinding disc includes a plurality of shoulders which project radially into said opening of said stationary disc and cooperate with said feeding and preliminary grinding means to effect a preliminary grinding action on the material which is being fed into the milling space.

References Cited by the Examiner
UNITED STATES PATENTS

| | | | |
|---|---|---|---|
| 777,228 | 12/1904 | Upton | 241—261 X |
| 2,094,548 | 9/1937 | Meeker | 241—98 X |
| 2,302,574 | 11/1942 | Richardson et al. | 241—98 X |
| 2,478,893 | 8/1949 | Brant | 241—261 X |
| 3,012,763 | 12/1961 | Martin | 259—9 X |

ROBERT C. RIORDON, *Primary Examiner.*

W. G. ABERCROMBIE, *Examiner.*